US009777852B2

United States Patent
Bonomi

(10) Patent No.: US 9,777,852 B2
(45) Date of Patent: Oct. 3, 2017

(54) NON-RETURN VALVE FOR A TUBULAR CONSOLIDATION ELEMENT

(71) Applicant: Cristiano Bonomi, Peschiera Borromeo (IT)

(72) Inventor: Cristiano Bonomi, Peschiera Borromeo (IT)

(73) Assignee: ELAS GEOTECNICA S.R.L., Segrate, Milan (IT)

( * ) Notice: Subject to any disclaimer, the term of this patent is extended or adjusted under 35 U.S.C. 154(b) by 0 days.

(21) Appl. No.: 14/981,081

(22) Filed: Dec. 28, 2015

(65) Prior Publication Data

US 2016/0131271 A1    May 12, 2016

Related U.S. Application Data

(63) Continuation of application No. 13/988,536, filed as application No. PCT/IB2011/053795 on May 21, 2013, now abandoned.

(30) Foreign Application Priority Data

Nov. 22, 2010    (IT) .................................. BO10A0699

(51) Int. Cl.
*F16K 15/14*    (2006.01)
(52) U.S. Cl.
CPC .......... *F16K 15/147* (2013.01); *F16K 15/142* (2013.01); *Y10T 137/0491* (2015.04); *Y10T 137/7879* (2015.04)
(58) Field of Classification Search
CPC .................. F16K 15/142; F16K 15/147; Y10T 137/7879; Y10T 137/0491

(Continued)

(56) References Cited

U.S. PATENT DOCUMENTS 3,179,300 A * 4/1965 Davidson ............... B65D 35/46
222/213
3,957,078 A    5/1976 Hlinsky
(Continued)

FOREIGN PATENT DOCUMENTS

CN           1131976 A     9/1996
CN         101768974 A     7/2010
(Continued)

OTHER PUBLICATIONS

Notification of Transmittal of the International Search Report and the Written Opinion issued in Application No. PCT/IB2011/053795 date of mailing Feb. 3, 2012 (1 page).
(Continued)

*Primary Examiner* — Craig Schneider
*Assistant Examiner* — P. Macade Nichols
(74) *Attorney, Agent, or Firm* — Flynn, Thiel, Boutell & Tanis, P.C.

(57) ABSTRACT

A non-return valve fitted on a tubular element for use for the reinforcement and consolidation of soil, for example, in an excavation. The non-return valve includes a portion of elastomer material which has a nick and is connected to a structural body tightened onto the tubular element. The structural body can be connected rigidly to the portion of elastomer material or may be at least partially incorporated therein. The body has a central portion with a window within which the nick is arranged, and the edges of the nick open out and function as a non-return valve under the action of a fluid under pressure injected into the interior of the tubular element and emerging from radial holes in the vicinity of the nick.

12 Claims, 7 Drawing Sheets

(58) Field of Classification Search
USPC ....... 137/512.15, 512.4, 597, 849, 853, 860; 277/320
See application file for complete search history.

(56) References Cited

U.S. PATENT DOCUMENTS

| | | | | |
|---|---|---|---|---|
| 4,620,648 | A | * | 11/1986 | Schwartzman ........ B65D 47/42 137/843 |
| 5,056,282 | A | | 10/1991 | Pflieger |
| 5,290,045 | A | | 3/1994 | Terauchi et al. |
| 6,044,869 | A | | 4/2000 | Koob |
| 6,092,551 | A | * | 7/2000 | Bennett ................ F16K 15/147 137/843 |

FOREIGN PATENT DOCUMENTS

| | | |
|---|---|---|
| CN | 201801861 U | 4/2011 |
| EP | 1 273 715 A1 | 1/2003 |

OTHER PUBLICATIONS

International Search Report issued in Application No. PCT/IB2011/053795 date of mailing Feb. 3, 2012 (4 pages).
Written Opinion of the International Searching Authority issued in Application No. PCT/IB2011/053795 date of mailing Feb. 3, 2012 (5 pages).
Office Action of People's Republic of China and Search Report issued in Application No. 201180056005.0 with English language translation dated Jun. 5, 2014 (11 pages).

* cited by examiner

NON-RETURN VALVE FOR A TUBULAR CONSOLIDATION ELEMENT

CROSS-REFERENCE TO RELATED APPLICATIONS

This is a continuation of prior U.S. application Ser. No. 13/988,536, filed May 21, 2013, which was the National Stage of International Application No. PCT/IB2011/053795, filed Aug. 30, 2011.

FIELD OF THE INVENTION

The present invention relates to the field of non-return valves for tubular consolidation elements.

BACKGROUND OF THE INVENTION

It is known to use tubular consolidation elements in the consolidation of soils and the like, for example, of an excavation wall or of a mass of soil which may be, for example, a tunnel face or roof or a mine gallery or any underground or exposed mass of soil. Non-return valves are provided in tubular consolidation elements of this type for the injection of consolidating liquids such as cementitious or chemical mixtures.

So-called "consolidation injections" represent one of the best solutions in soil consolidation. This technique involves the formation of a series of drill holes in the ground or soil undergoing consolidation, into which corresponding elongate tubular elements are inserted. Each of these tubular elements, which may also have reinforcing functions, is hollow and has one or more holes in its lateral surface. A consolidation material in the fluid state, generally liquid cement or a functionally similar mixture, is injected into the tubular element, emerges from the holes in the lateral surface of the tubular element, and permeates and penetrates the soil region surrounding the drill hole. The setting of the injected material stiffens the soil, consolidating it.

The tubular element has, in general, several radial holes arranged various distances apart along the tubular element. Normally, instead of a single hole at a certain position along the length of the tubular element, it is preferred to provide a group of two or more holes and, in this case, the radial holes of each group are arranged on the same circumference, spaced apart angularly to a predetermined extent. A special external valve, also known as a "manchette valve" is fitted in the vicinity of each individual hole or group of two or more holes and acts as a non-return valve with respect to the consolidation material that is injected into the tubular element. In fact, the valve opens as a result of the pressure of the injection of the consolidation material into the tubular element, allowing the material to emerge from the radial holes into the surrounding soil region. The valve then closes almost hermetically when the pressure ceases so as to prevent an undesired flow of the injected material back into the tubular element.

According to the prior art, the manchette valve is formed substantially by a rubber ring which is fitted on the outside of the tubular element in the vicinity of the individual holes so as to cover them. This resilient rubber ring generally has a width of between about 40 and 60 mm and is fitted manually along the tubular element in the vicinity of one of the groups of radial holes defined in the tubular element. The number of valves thus depends on the number of individual holes or, more preferably, groups of holes defined in the tubular element, which in turn is variable according to need and application.

Clearly, the manchette valves must be efficient and inexpensive in order for the consolidation injection technique to be competitive. It is therefore fundamental that the rubber rings which constitute them should always stay in the correct position, above all during the insertion of the tube in the drill hole.

For this purpose, the prior art provides for the rubber ring which forms the manchette valve to be housed in an annular groove which is at least as wide as the ring and about 2.0-2.5 mm deep and which is produced by the removal of material from the lateral surface of the tubular element in the region of each group of radial holes.

This solution of the prior art has various disadvantages, however; in the first place, there is a decline in the mechanical performance of the tube the lateral surface of which is weakened in the region of each groove or seat for the rubber ring; in the second place, the preliminary machining operations to be performed on the tubular profile are notable and expensive in terms of time since it is necessary to provide for the drilling and for the removal of material in the region of each group of holes.

Another disadvantage is the need to provide two rigid annular elements on the exterior of the tube above and below the rubber ring; these annular elements are glued to the tube radially and prevent movement of the ring in the longitudinal direction, preventing the holes formed radially in the walls of the tubular element being exposed during the introduction of the tubular element into the drill hole in the soil, with the risk of obstruction of the radial holes and the interior of the tubular element, prejudicing the use of the tubular element and the functional capacity of the valves downstream. This means that the axial fitting of each rubber ring must be precise, above all in view of the fact that a tubular element of the type mentioned above may be as much as ten meters or more long.

Other disadvantages of known tubular injection elements are that conventional manchette valves are prone to being detached from their seats, for example, by sliding along the tube or by rolling along it during the movement or the insertion of the tubular elements in the respective drill holes.

SUMMARY OF THE INVENTION

On the basis of the remarks made above, the objective of the present invention is to provide a non-return valve which solves the above-mentioned and other problems The non-return valve described is particularly easy to put in place and can maintain its allotted position in a stable manner.

The non-return valve described can be put in place without the need for preliminary machining of the outer surface of the tubular element for which the valve is intended.

The non-return valve described is reliable and easy to produce at competitive cost.

The subject of the present invention is therefore a non-return valve as defined in the appended claims. In a particular embodiment, the non-return valve is intended for a tubular consolidation element and comprises a valve portion made of elastomer material coupled with a structural connection body. The valve portion has at least one nick with lips or edges which are normally side by side and which can be opened out under the action of a fluid under pressure, and the structural body can be tightened in the desired position on a tubular consolidation element.

In one embodiment of the invention, the structural body is preferably made of metal. The coupling of a layer of elastomer material with a metal body which can, for example, be deformed so as to be wrapped around the tubular consolidation element like a collar advantageously combines the benefits of both materials. More particularly, use is made of the resilience and flexibility of the elastomer material and of the strength and ease of fitting of the metal body which can nevertheless preferably be deformed to form a collar.

The present invention also relates to a tubular consolidation element for the consolidation of soils and the like, for example, an excavation which may be, for example, a tunnel or a gallery, and, in any case, more generally, for the consolidation of a mass of soil. In particular, the tubular element comprises at least one radial hole through which the consolidation material in the fluid state can pass from the interior to the exterior of the tubular element. The tubular element comprises at least one non-return valve of the type described and claimed. In a particular embodiment, the non-return valve is fitted on the tubular element in such a manner that the at least one nick is located substantially in the vicinity of the at least one radial hole.

The present invention also relates to a method of manufacturing a non-return valve as described. The method provides for the valve portion which is made of elastomer material to be combined with a structural connecting body, preferably made of metal, and for the at least one nick then to be formed therein. The metal structural body is preferably but in non-limiting manner incorporated in the elastomer material during the process for the vulcanization or moulding of the valve portion.

BRIEF DESCRIPTION OF THE DRAWINGS

Further characteristics and advantages of the invention will become clearer in the light of the detailed description of preferred but not exclusive embodiments of a non-return valve according to the present invention which are described by way of non-limiting example with the aid of the appended drawings in which.

The same reference numerals and letters identify the same elements or components in the drawings.

DETAILED DESCRIPTION

Figure 1:
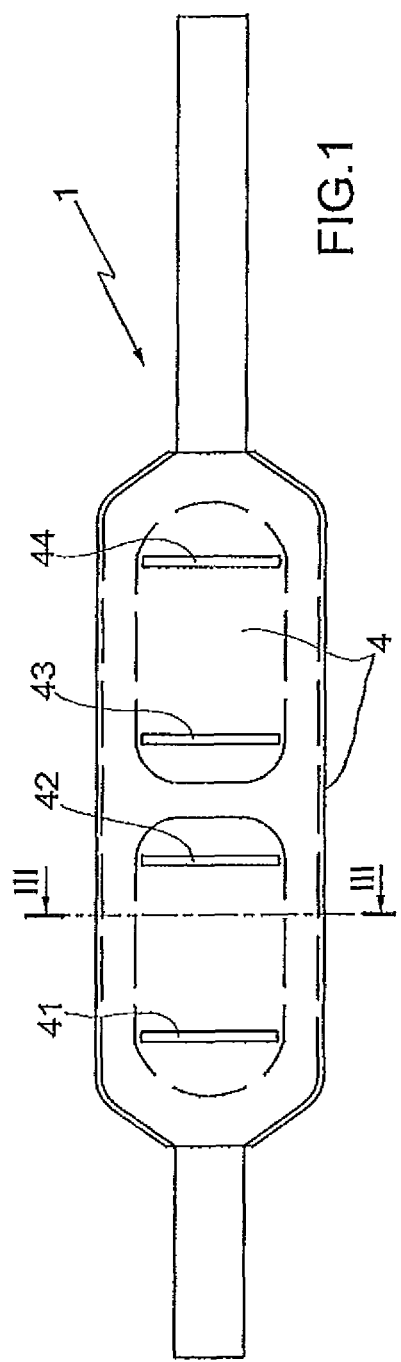
FIG. 1 is a plan view of an embodiment of a non-return valve according to the present invention.

With reference to FIGS. 1 to 4, a non-return valve 1 according to the present invention comprises a valve layer or portion 4 made of elastomer material which is generally coupled with or in some cases even incorporates a structural body 2 that is preferably made of metal, although the use of materials of various types including metal alloys, plastics materials, composite materials and the like is not excluded. The structural body 2 is, in any case, preferably deformable from a flat or substantially flat configuration as shown in the drawing so as to be bent to form a type of "collar" to be wrapped around and tightened onto a tubular element, as will become clearer from the following part of the present description. Naturally, the structural body 2 may also be pre-formed in a bent or partially bent shape which can nevertheless be wrapped around and tightened further onto the lateral surface of a tubular consolidation element.

The use of rubber or, more generally, of a thermoplastic material has been found particularly suitable, although not in a limiting manner, for the construction of the valve portion 4 of elastomer material but other materials having substantially equivalent characteristics or in any case functionally equivalent materials may be used. The use of a transparent or semi-transparent material through which it is possible to see or perceive the surface of the tubular consolidation element on which the non-return valve is fitted and, in particular, in order to position it well with respect to the radial holes formed in the wall of the tubular element, as will be described further below, has been found particularly useful.

Figure 2:
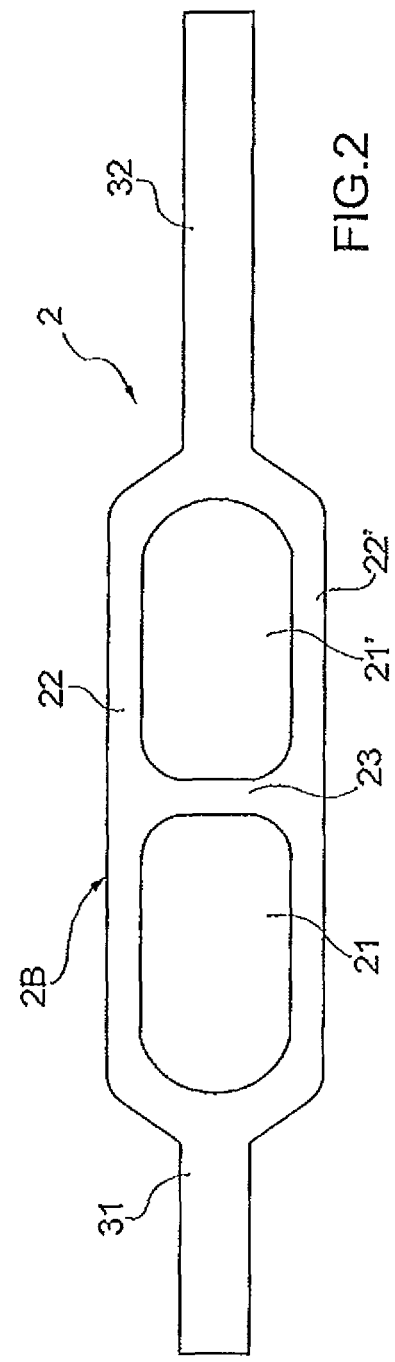
FIG. 2 is a plan view of a structural body of the non-return valve of FIG. 1.

With reference to FIG. 2, the structural body 2, in its preferred configuration prior to being fitted on a tubular consolidation element, that is, not yet deformed to form a "collar", extends substantially in a plane and has a relatively small thickness so as to be conveniently flexible in order to be bent and wrapped around the almost cylindrical outer surface of a tubular consolidation element, in use. The expression "deformable to form a collar" is intended to indicate the ability of the body 2 to change from the substantially flat configuration which is the preferred manufacturing configuration of the non-return valve of the present invention, shown in FIG. 2, to a substantially "annular" configuration which enables the structural body 2, and hence the valve 1, to extend around a tubular element 3 externally, as shown schematically in FIG. 4.

Still with reference to FIG. 2, the structural body 2 comprises two end connection appendages 31 and 32 which are intended to be connected to one another in use to act as mechanical connection means and thus to enable the non-return valve 1 to clasp and grip the outer surface of the tubular element 3. The connection appendages 31 and 32 extend on opposite ends of the central portion 2B of the structural body 2. The mechanical connection means also comprise a mechanical seal (not shown) or functionally similar means of known type for connecting the connection ends 31, 32 to one another so as to fix and tighten the central portion 2B, which is substantially bent, against the outer surface of the tubular element 3. The mechanical seal which can be fitted, for example, by means of a pneumatic machine or other automatic, semi-automatic or manually-operated tool suitable for the purpose, may be constituted specifically by a screw element, a bolt, a clamp, or any other functionally equivalent means which can firmly connect the two connection ends 31, 32 to prevent their detachment, at the same time exerting the tension necessary to keep the valve 1 firmly adhering to the outer surface of the tubular element 3.

In a variant, not shown, the connection means may also comprise only one of the two connection appendages 31, 32 which extends from a first end of the central portion 2B of the structural body 2, whereas a slot or slit in which the connection end 31 can be inserted is provided at the other end of the central portion 2B, instead of the other connection appendage described above. Here again, a mechanical seal or similar means may be used to close and tighten the structural body 2 when it has been deformed to form a collar.

The central portion 2B of the structural body is preferably formed by a relatively thin metal plate, for example, made of steel of other metal, although the use of other materials as mentioned above is not excluded, in which two openings or holes 21, 21' are formed, separated by a transverse partition 23 and thus defining a first contact portion 22 and a second contact portion 22' which are substantially parallel to one another, are situated on opposite sides of the openings 21, 21', and have the function of keeping the edges of the layer 4 of elastomer material in contact with the outer surface of the tubular profile when the non-return valve 1 is fitted thereon. Naturally, it is also possible to provide only one of the two openings 21, 21' or even to make more than two openings which are aligned, side by side, or in various configurations. For example, another embodiment of the non-return valve in which the structural body 2 has four openings will be described further below.

More generally, the configuration of the structural body of the non-return valve according to the invention is such that it has good mechanical strength, above all with respect to tensile stresses in the longitudinal direction, that is, in the direction in which the connection appendages 31, 32 extend.

Incisions or nicks 41, 42, 43, 44 are formed in the resilient layer 4 in the vicinity of the openings 21, 21' in the structural body 2 of the non-return valve 1 (see FIG. 1). The edges or lips of the nicks 41-44 are normally arranged substantially side by side but they can open out under the effect of the pressure of a fluid, for example, cementitious consolidation grout or the like, acting on one of the two faces of the resilient layer 4. The resilience of the material causes the edges of the nicks 41-44 then to close up so as to be side by side again if the fluid pressure ceases or if it is balanced by a counter-pressure on the other face of the resilient layer 4, in any case in general preventing flow-back of the fluid in the opposite direction to that in which it comes out of the nicks 41-44. In the embodiment shown in FIG. 2, there are four nicks 41-44 but this is intended purely as an example since a non-return valve according to the present invention even with only one nick, or with two, three or four nicks, as in the embodiment of FIG. 2, or even with a larger number of nicks, can easily be devised and produced without thereby departing from the general concept described herein.

According to the type of application and in particular to the diameter of the tubular element 3 on which the non-return valve 1 is to be fitted, the central portion 2B of the structural body 2 may comprise a single opening 21 or the two openings 21, 21' that are shown in FIG. 2, or even a plurality of openings or windows, a particular but non-limiting example of which will be described below. Each of these openings may be of a size such as to house one or more nicks 41-44 formed in the resilient layer 4.

In any case, all or only some of the one or more nicks 41-44 in the resilient layer 4 may be through-nicks, that is, such as to extend through the entire thickness of the resilient layer 4, or all of or only some of the nicks may even extend as far as a predetermined depth without extending through the entire layer 4 of elastomer material. In this latter case, the elastomer material of the resilient layer 4 is in any case weakened along the nicks which are not through nicks and which, in short, are pre-nicks that are formed as such during the manufacture of the non-return valve of the present invention. Once in operation, the pressure of the material in the fluid state which is supplied into the tubular element (concrete, cementitious grout, or other materials suitable for use with the tubular elements for the applications envisaged) brings about rupture of the elastomer material precisely in the vicinity of the pre-nicks which are not through-nicks, rendering them through-nicks so as to produce the above-mentioned edges or lips which are arranged side by side and which contribute to the operation of the non-return valve of the present invention.

Figure 3:
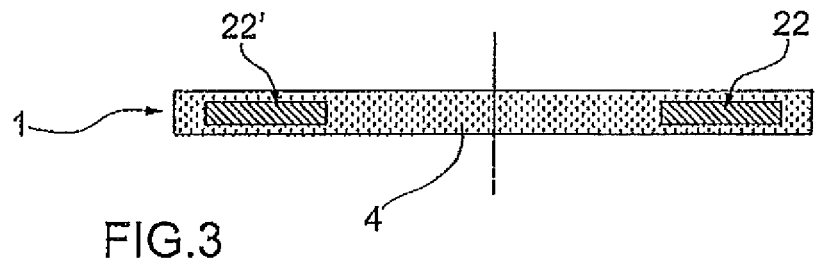
FIG. 3 is a cross-section taken on the line III-III of FIG. 1.

As can be seen in the cross-section of FIG. 3, which is taken on the line III-III of FIG. 1, the central portion 2B of the structural body 2 is incorporated in the resilient layer 4, from which the connection appendages 31, 32 project; this preferably takes place during the vulcanization process, for example by injection of the resilient layer 4 of elastomer material. In this connection, the structural body 2 shown in FIG. 2 may advantageously be placed inside the mould that is used for the vulcanization of the resilient layer 4 of elastomer material so that the two elements (structural body 2 and resilient layer 4) are firmly connected to one another upon completion of the process.

FIG. 3 shows the result of the process just described. It can be seen that the two contact portions 22, 22' of the central portion 2B of the structural body 2 are surrounded on all sides by the elastomer material of the resilient layer 4 so as to be completely incorporated therein. In particular, they may adopt an approximately central position relative to the thickness of the resilient layer 4.

Figure 3B:
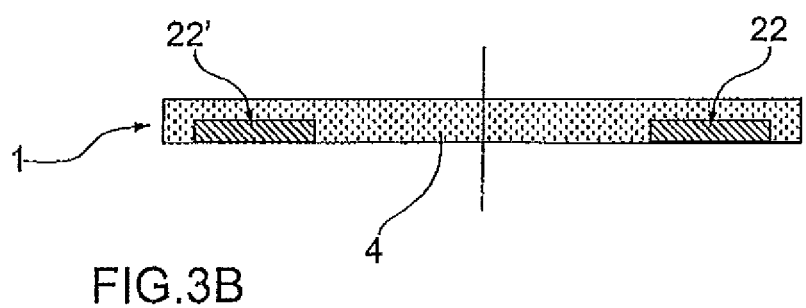
FIGS. 3B and 3C are cross-sections similar to that of FIG. 3 relating to alternative embodiments of a non-return valve according to the present invention.
Figure 3C:
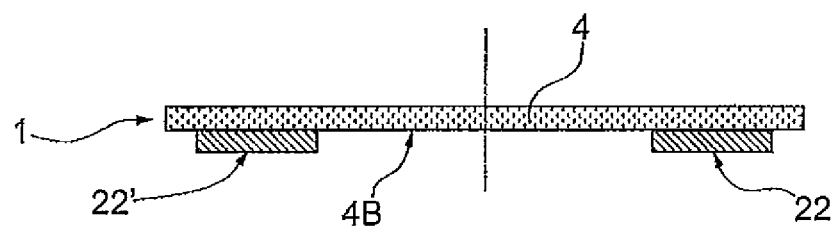

FIG. 3B shows a cross-section through a variant of the non-return valve in which the two contact portions 22, 22' of the central portion 2B of the structural body 2 are only partially surrounded by the elastomer material of the layer 4. FIG. 3C shows a cross-section through another variant of the non-return valve in which the central portion 2B of the structural body 1 is caused to adhere to a face of the resilient layer 4 without being incorporated therein, preferably during a stage after the manufacture of the resilient layer 4, for example, by gluing or by another connection system. In this case, the one or more incisions 41-44 may advantageously also be produced before the fitting of the structural body 2 on the resilient layer 4.

According to another variant, not illustrated, the structural body 2 is coupled with the elastomer layer 4 without a true and proper firm mutual connection but by virtue of an encircling action of the structural body 2 which is laid on the elastomer layer positioned on the outer wall of the tubular element and is then tightened around the tubular element.

Figure 4:
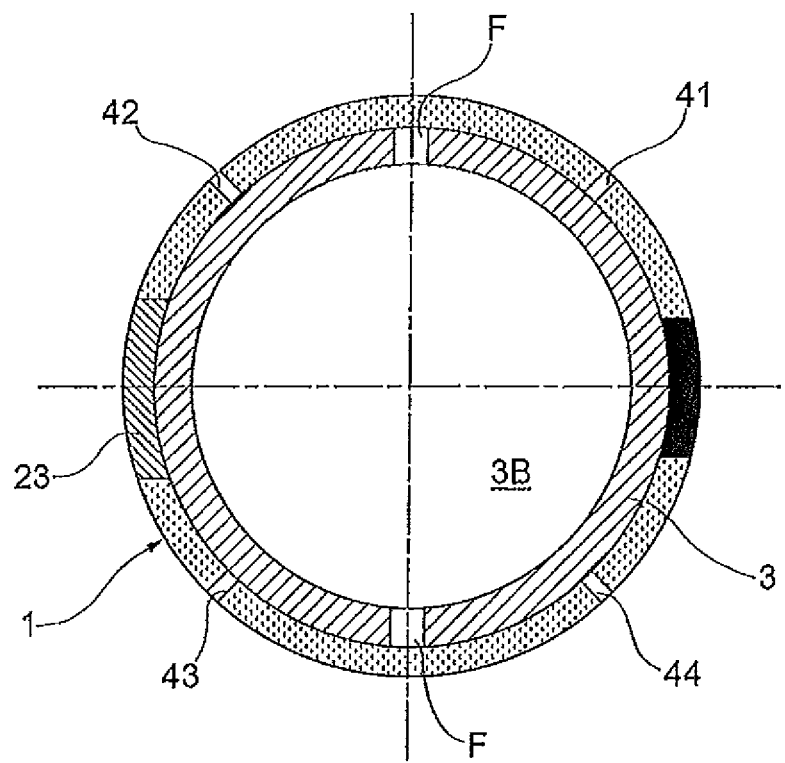
FIG. 4 is a section through a tubular consolidation element on which a non-return valve according to the present invention is fitted.
Figure 5:
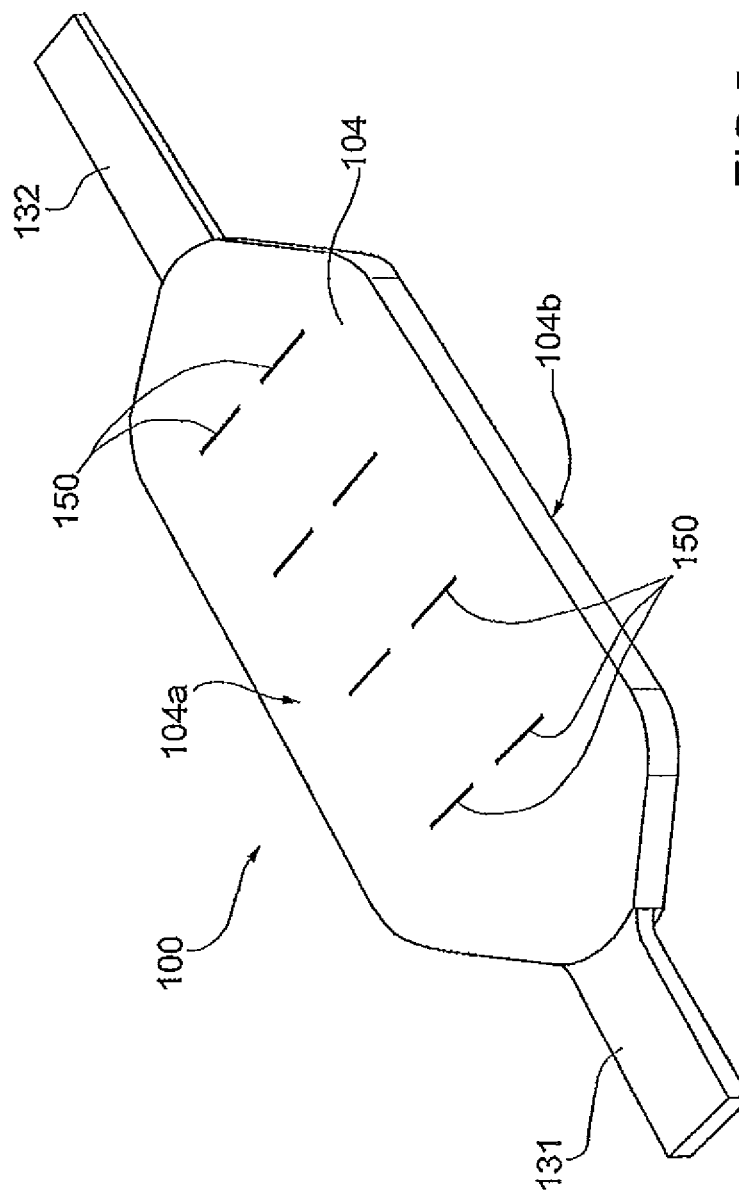
FIG. 5 is a perspective view of another embodiment of a non-return valve according to the present invention.

FIG. 4 shows schematically, in cross-section, a tubular reinforcing and consolidation element 3 on which a non-return valve 1 according to the present invention has been fitted. More precisely, the valve 1 has been fitted in the vicinity of a group of holes F formed through the wall of the tubular element 3. In the embodiment of FIG. 4, the holes F are arranged on a common circumference and extend in radial directions although they could be arranged in different configurations. By virtue of its deformability, the valve 1 is wrapped around the tubular element like a collar which remains firmly fixed there by means of the connection ends 31, 32 of the structural body 2.

Figure 6:
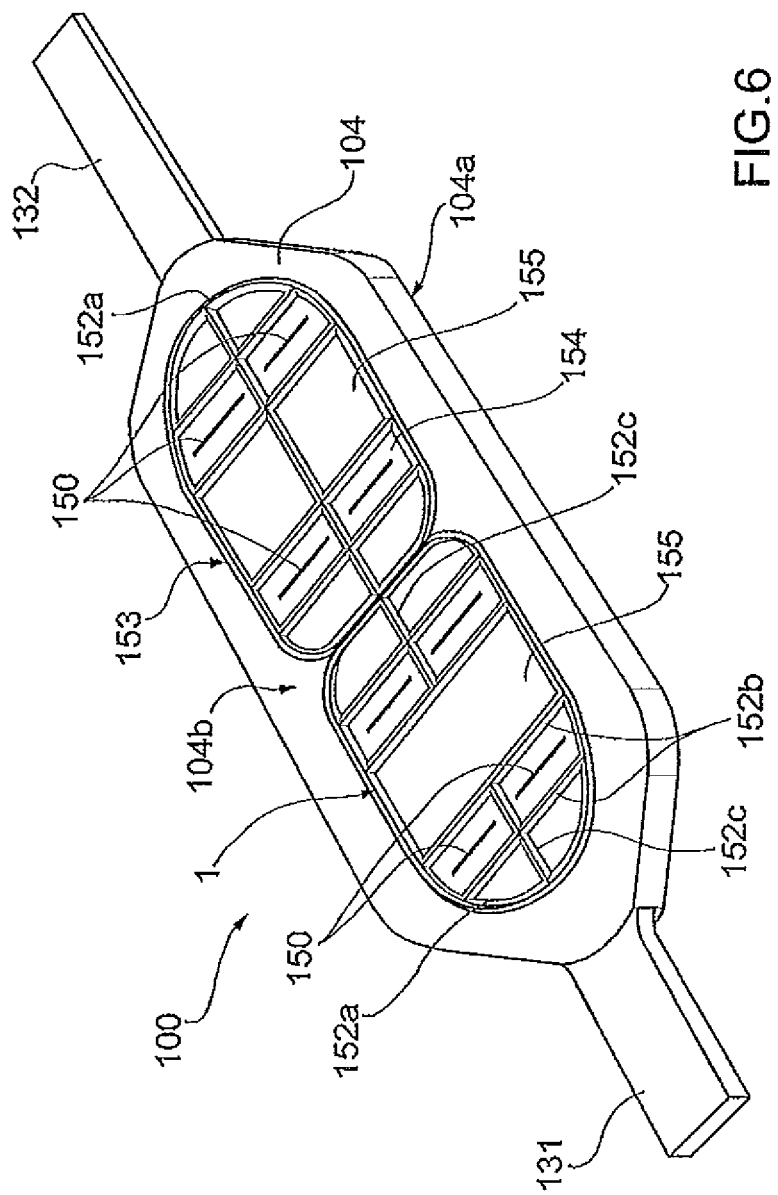
FIG. 6 is a perspective view of the non-return valve of FIG. 5 turned onto its rear side which is intended to come into contact with the lateral surface of a tubular consolidation element.
Figure 7:
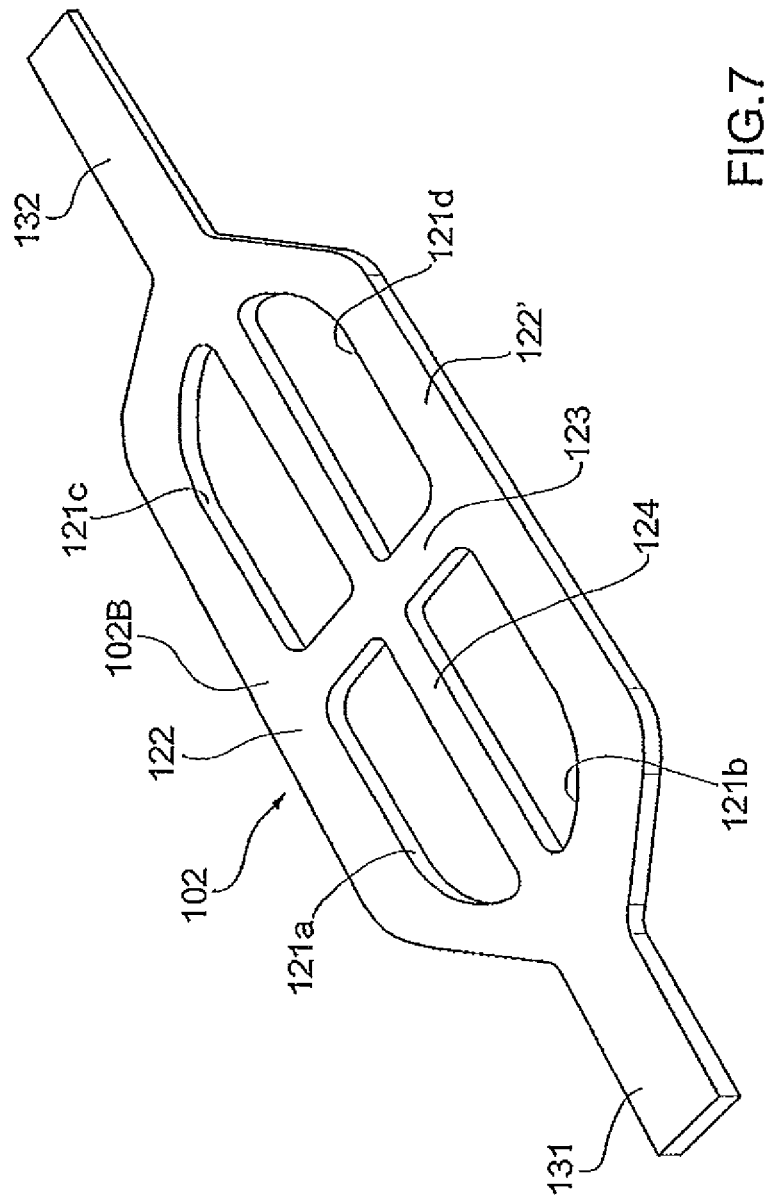
FIG. 7 is a perspective view of a structural body of the non-return valve of FIGS. 5 and 6.
Figure 8:
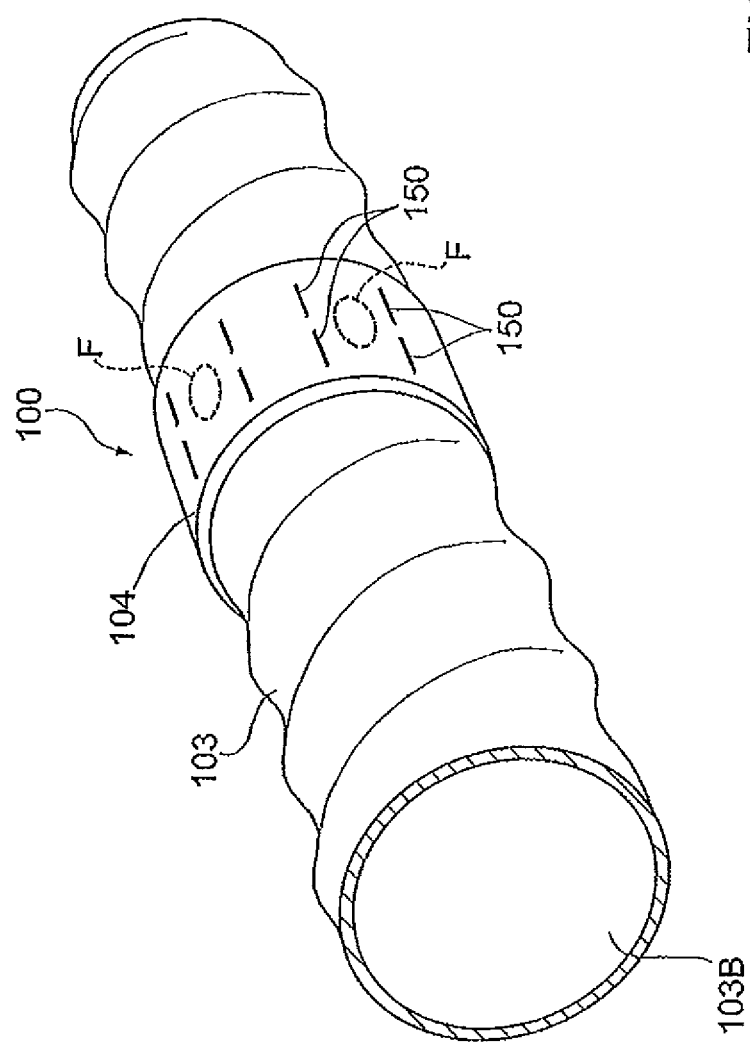
FIG. 8 is a perspective view of a portion of the tubular consolidation element on which the non-return valve of FIGS. 5 and 6 is fitted in its position of use.

FIGS. 5 to 8 show another embodiment of the non-return valve of the present invention, the main features as well as the possible variants of which are similar to those described above with reference to the first embodiment which are therefore intended also to be applicable to this embodiment unless specified otherwise. The non-return valve 100 comprises a valve layer or portion 104 of elastomer material with a front face 104a and a rear face 104b. A structural body 102 (FIG. 7), preferably made of metal although the use of materials of other types including metal alloys, plastics materials, composite materials and the like is not excluded, is generally coupled with the layer 104 of elastomer material and in some cases even incorporated therein. The structural body 102 has substantially the same features as those described with reference to the structural body 2 of the non-return valve describe above. It is also therefore preferably deformable from a flat or substantially flat configuration as shown in FIG. 7 so as to be bent and to form a type of "collar" to be wrapped around and tightened onto a tubular element 103, as can be seen in FIG. 8. Naturally, here again, the structural body 102 may be pre-formed into a bent or partially bent shape which in any case can be wrapped around and tightened further onto the lateral surface of a tubular consolidation element.

The structural body 102 comprises two end connection appendages 131 and 132 which are intended to be connected to one another in use to act as mechanical connection means and thus to enable the non-return valve 100 to clasp and grip the outer surface of the tubular element 103. The connection appendages 131 and 132 extend at opposite ends of the central portion 102B of the structural body 102. As described above, the mechanical connection means also comprise a mechanical seal (not shown) or functionally similar means for connecting the connection ends 131, 132 to one another so as to fix and tighten the central portion 102B which is substantially bent, against the outer surface of the tubular element 103. Here again, a variant, not illustrated, provides for the connection means to comprise only the connection appendage 132 which can be inserted, in use, in a slot or slit provided at the other end of the central portion 102B of the structural body 102.

The central portion 102B of the structural body 102 is preferably formed by a relatively thin sheet, for example, of steel or other metal, although the use of different materials as mentioned above is not excluded. Four openings or windows 121a, 121b, 121c, 121d are formed in the central portion 102B and are separated by a transverse partition 123 and by a longitudinal partition 124. Here again, two substantially parallel and opposed longitudinal contact portions 122, 122' are defined in the central portion 102B of the structural body 102 and have the function of keeping the edges of the layer 104 of elastomer material in contact with the outer surface of the tubular profile 103 when the non-return valve 100 is fitted thereon. The longitudinal partition 124, which is substantially aligned centrally in continuity with the connection ends 131, 132, provides the structural body 2 with particular strength in the condition in which it binds or encircles the lateral surface of the tubular consolidation element 103, extending tightly around it.

Incisions or nicks 150 are formed in the resilient layer 104 in the vicinity of the openings 121a-121d of the structural body 102 (see FIGS. 5 and 6), the edges or lips of the nicks 150 normally being arranged substantially side by side but being able to open out under the effect of the pressure of a fluid, for example, cementitious consolidation grout or the like, acting on the rear face 104b of the resilient layer 4. In the embodiment illustrated in FIGS. 5 and 6, there are eight nicks 150, two for each of the openings 121a-121d, but this is intended as a preferred and non-limiting example since a non-return valve with a number of nicks 150 other than that illustrated may easily be devised and produced. Here again, nicks which are not through-nicks, that is, pre-nicks may be provided during the manufacture of the non-return valve and then open out completely under the thrust of the cementitious grout or other material when the non-valve is in use fitted on the tubular consolidation element 103.

As can be seen in detail in FIG. 6, a set of ridges 152 is formed on the rear face 104b of the resilient layer 104; the ridges 152 are integral with the elastomer material of the resilient layer 104 and are therefore also relatively resilient and hence flexible and deformable under the action of the pressure of the cementitious grout or other material, as described above. The ridges 152 preferably have an almost triangular cross-section with an apex 153 which is flexible and relatively deformable so as to adapt better to the unevenness and any roughness of the lateral surface of a tubular consolidation element 103. In greater detail, in the preferred, non-limiting embodiment of FIG. 6, the set of ridges 152 comprises a pair of adjacent frame ridges 152a within which transverse ridges 152b are provided which intersect longitudinal ridges 152c to define small areas 154 in some of which the nicks 150 are formed whereas two larger zones 155 are provided for being positioned in the vicinity of the radial holes F formed in the wall of a tubular consolidation element 103 (see FIG. 8). The ridges 152 thus improve the leaktightness of the non-return valve of the present invention, above all when it is fitted on a tubular consolidation element which has an imperfectly smooth lateral surface such as can be seen, for example, in the example of FIG. 8 in which the positioning of the radial holes F, which are preferably visible through the resilient layer 4 of transparent or semi-transparent material, alongside the nicks 150 is also shown.

It is pointed out that the non-return valve according to the present invention is much easier to fit than conventional manchette valves since the latter are closed annular members and have to be slid along the tubular consolidation element until they reach the desired position. In contrast, the non-return valve according to the invention can be fitted directly at the point of interest by moving it towards the tubular element in a radial direction and wrapping it around the element so that the nicks 41-44, 150 are arranged in the vicinity of the radial holes F so as to close the passageway from the exterior to the interior of the tubular element but at the same time to permit unidirectional movement of pressurized product in the fluid state from the interior of the tubular element to the exterior.

The force with which the non-return valve of the present invention is tightened onto the outer surface of the tubular element may advantageously be such as to lock the valve, preventing any movement thereof relative to the tubular consolidation element, without the resilient portion of the valve deteriorating as a result of the tightening since the mechanical forces are absorbed almost entirely by the structural body 2, 102 which, in this connection, is preferably but in non-limiting manner made of metal. In this respect, pneumatic, mechanical or combined, automatic, semi-automatic, or manual tools suitable for exerting the desired tightening force on the mechanical connection means of the non-return valve, may be used for the tightening of the non-return valve of the present invention.

In use, one or more non-return valves according to the present invention are fitted on a tubular consolidation element 3, 103 before it is inserted in a hole formed in the soil to be consolidated. A consolidation material in the fluid state (cementitious grout or mixtures thereof) is injected into the internal cavity 3B, 103B of the tubular consolidation element and emerges therefrom through the holes F formed in its wall. Owing to its pressure, the consolidation material then passes through the nicks 41-44, 150 defined in the resilient layer 4, 104, in one or other embodiment of the non-return valve described above, in order then to spread out in the external region surrounding the tubular consolidation element. During the injection of consolidation material in the fluid state, the elastomer material which constitutes the resilient layer 4, 104 is deformed, allowing the consolidation material in the fluid state to pass from the outlet of the holes F to beyond the nicks 41-44, 150.

The non-return valve of the present invention can preferably be manufactured by connecting a structural body 2, 102. as described above with reference to the two embodiments, respectively, to a resilient layer 4, 104 of elastomer material in which the through nicks or non-through nicks 41-44, 150 are then formed. The nicks are preferably formed in the vicinity of the openings or windows 21, 21', 121a-121d described above.

According to one embodiment of the method according to the invention, the structural body 2, 102 is incorporated in the resilient layer 4, 104 of elastomer material during the process for the vulcanization thereof (that is, preferably by co-moulding by injection or similar techniques) so as to form a single body. Alternatively, the structural body 2, 102 may be connected to a surface of the resilient layer 4, 104 by gluing or adhesion of another type.

The structural body 2, 10-2 is preferably made of metal and, even more preferably but in non-limiting manner, of steel and can be produced by hot pressing or even by punching or blanking of a metal sheet.

The nicks in the valve portion 4, 104 are preferably straight, as shown in the drawings, but the possibility that they may also have a different shape, for example, semi-circular or variously shaped, or that they may be formed by perforation without removal of material of the resilient layer 4, 104, is not excluded.

The present invention is also directed towards a tubular consolidation element for the consolidation of soils and the like, for example, of an excavation wall or of a mass of soil which may be, for example, a tunnel face or roof, a mine gallery, or any underground or exposed mass of soil. A tubular consolidation element of this type, indicated by reference numerals 3 and 103 in FIGS. 4 and 8, respectively, is constituted, for example, by a circular-sectioned profile, optionally corrugated or undulated along its longitudinal extent, for example, made of resin-glass or other materials. The tubular element 3, 103 comprises at least one radial hole F for allowing consolidation material in the fluid state, which is injected into its interior in the cavity 3B, 103B, to flow out of the tubular element. The tubular element 3, 103 according to the invention comprises a non-return valve 1, 100 as described above, which is fitted on the outer surface of the tubular element so that at least one of the nicks defined in the layer 4, 104 of elastomer material of the non-return valve is located substantially in the vicinity of a corresponding radial hole F. The radial holes F are thus covered by a layer of elastomer material of the non-return valve, adjacent one or more of the nicks 41-44, 150.

The technical solutions adopted for the non-return valve of the present invention achieve the objectives indicated above. In particular, the non-return valve described can easily be put in place on the tubular consolidation element and can remain firmly in the position allocated to it. Moreover, the non-return valve advantageously does not require the production of seats in the outer surface of the tubular profile to which it is allocated. The non-return valve described has also been found reliable and strong by virtue of the presence of the structural body which is preferably made of metal or another material with good mechanical characteristics which advantageously reinforces the structure of the layer of elastomer material.

The injection valve thus devised may undergo many modifications and variations all of which fall within the scope of the inventive concept.

The invention claimed is:

1. A non-return valve for a tubular consolidation element, comprising a valve portion having at least one nick which can open out under action of a fluid under pressure, the valve portion being connected, in use, to a structural body which can be tightened selectively around a tubular consolidation element, wherein the structural body has a widened central portion which is connected to the valve portion and from which at least one connection appendage extends for the tightening of the non-return valve onto the tubular consolidation element, in use.

2. The non-return valve according to claim 1, wherein the structural body is connected rigidly to the valve portion.

3. The non-return valve according to claim 2, wherein the structural body is incorporated at least partially in the valve portion.

4. The non-return valve according to claim 1, wherein the central portion of the structural body is incorporated in the valve portion, the at least one connection appendage projecting from the valve portion.

5. The non-return valve according to claim 1, wherein the central portion comprises at least one opening within which the at least one nick of the valve portion is arranged.

6. The non-return valve according to claim 1, wherein the central portion has at least one central longitudinal partition.

7. The non-return valve according to claim 1, wherein the structural body is made of metal.

8. The non-return valve according to claim 1, wherein the valve portion is made of elastomer material.

9. The non-return valve according to claim 8, wherein the elastomer material of the valve portion is transparent or semi-transparent.

10. The non-return valve according to claim 1, comprising a plurality of flexible ridges arranged on a rear face of the valve portion which rear face is intended, in use, to bear against an outer surface of a tubular consolidation element.

11. A tubular consolidation element having at least one radial hole for the passage of material in the fluid state from an interior to an exterior thereof, comprising a non-return valve, the non-return valve comprising a valve portion having at least one nick which can open out under action of a fluid under pressure, the valve portion being connected in use to a structural body which can be tightened selectively around the tubular element so that the at least one nick is arranged substantially in a vicinity of at least one radial hole, wherein the structural body has a widened central portion which is connected to the valve portion and from which at least one connection appendage extends for the tightening of the non-return valve onto the tubular consolidation element, in use.

12. A method of manufacturing a non-return valve comprising the steps of:
providing a structural body;
then connecting a valve portion made of elastomer material to the structural body; and then forming at least one nick in a region of the valve portion which is not covered by the structural body;

wherein the step of providing is performed before the step of connecting and the step of connecting is performed before the step of forming; and wherein the structural body has a widened central portion which is connected to the valve portion and from which at least one connection appendage extends for tightening of the non-return valve onto a tubular consolidation element, in use.

* * * * *

UNITED STATES PATENT AND TRADEMARK OFFICE
CERTIFICATE OF CORRECTION

PATENT NO. : 9,777,852 B2
APPLICATION NO. : 14/981081
DATED : October 3, 2017
INVENTOR(S) : Cristiano Bonomi Page 1 of 1

It is certified that error appears in the above-identified patent and that said Letters Patent is hereby corrected as shown below:

On the Title Page

Please amend item (73) as follows:
Change "Segrate, Milan (IT)" to --- Segrate, Milano (IT) ---

Please amend item (63) as follows:
Change "May 21, 2013" to --- August 30, 2011 ---

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*